United States Patent
Occella et al.

[11] Patent Number: 5,927,246
[45] Date of Patent: Jul. 27, 1999

[54] INTERNAL COMBUSTION DIESEL ENGINE FOR MOTOR-VEHICLES, WITH DIRECT INJECTION

[75] Inventors: Sergio Occella, Turin; Constantinos Vafidis, Orbassano; Francesco Calvi, Turin, all of Italy

[73] Assignee: C.R.F. Societa Consortile per Azion, Orbassano, Italy

[21] Appl. No.: 08/839,362

[22] PCT Filed: Sep. 23, 1996

[86] PCT No.: PCT/EP96/04148

§ 371 Date: Apr. 18, 1997

§ 102(e) Date: Apr. 18, 1997

[87] PCT Pub. No.: WO97/14879

PCT Pub. Date: Apr. 24, 1997

[30] Foreign Application Priority Data

Oct. 17, 1995 [IT] Italy ................... TO95A0834

[51] Int. Cl.⁶ .................. F02B 3/06; F02F 1/42
[52] U.S. Cl. .................................................... 123/302
[58] Field of Search ........................ 123/301, 302, 123/308

[56] References Cited

U.S. PATENT DOCUMENTS

| | | | |
|---|---|---|---|
| 3,832,983 | 9/1974 | Nickly | 123/302 |
| 3,903,849 | 9/1975 | List et al. | 123/308 |
| 4,703,729 | 11/1987 | Sakano et al. | 123/308 |
| 5,150,677 | 9/1992 | Aoyama | 123/302 |
| 5,343,839 | 9/1994 | Baika et al. | 123/257 |
| 5,427,065 | 6/1995 | Kinoshita et al. | 123/90.44 |
| 5,676,107 | 10/1997 | Yuzuriha et al. | 123/302 |

FOREIGN PATENT DOCUMENTS

| | | |
|---|---|---|
| 0448525 | 9/1991 | European Pat. Off. . |
| 0565515 | 10/1993 | European Pat. Off. . |
| 0588195 | 3/1994 | European Pat. Off. . |
| 0666409 | 8/1995 | European Pat. Off. . |
| 4315233 | 7/1994 | Germany . |

Primary Examiner—Andrew M. Dolinar
Assistant Examiner—Arnold Castro
Attorney, Agent, or Firm—Sughrue, Mion, Zinn, Macpeak & Seas, PLLC

[57] ABSTRACT

A direct injection Diesel engine for motor-vehicles, with small displacement, is described, which comprises a number of cylinders in line each provided with two intake valves and two exhaust valves driven by two cam-shafts arranged in the cylinder head, by means of rocker arms. The arrangement of the intake apertures (2, 3) and the exhaust apertures (4, 5) is such that the injector device can be housed centrally therebetween and the pre-heating glow-plug can be housed on one side, between one intake aperture and one exhaust aperture, while the overall dimensions of the engine are greatly reduced and intake and exhaust conduits (6, 7, 8) are formed which ensure optimum performance of the engine and a low fuel consumption.

3 Claims, 5 Drawing Sheets

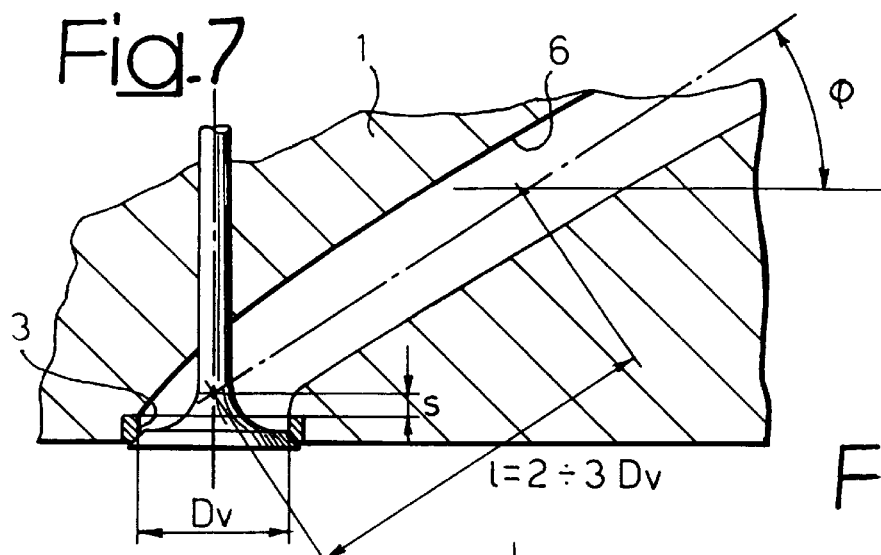
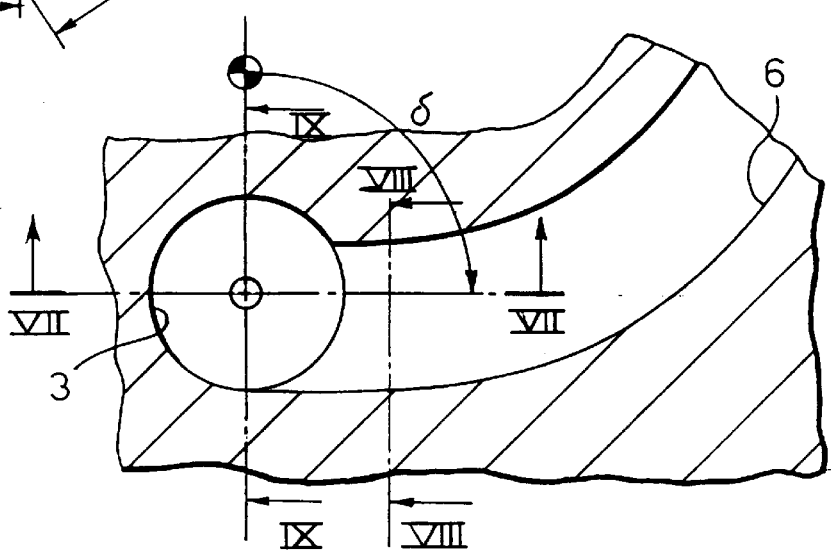
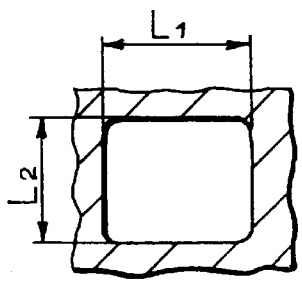
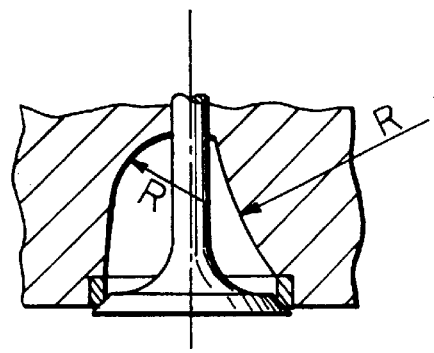

ial plan view of the cylinder head forming part of the engine according to a first embodiment of the invention,

INTERNAL COMBUSTION DIESEL ENGINE FOR MOTOR-VEHICLES, WITH DIRECT INJECTION

BACKGROUND OF THE INVENTION

The present invention relates to internal combustion Diesel engines, for motor-vehicles, having a number of cylinders in line, with direct injection.

In particular, the invention relates to an engine of this type having small displacement (in the order of 550 cc. or less, up to 250 cc. for each cylinder), which has vary reduced dimensions and a low fuel consumption.

In engines of this type, there is the need, on one hand, to ensure good performances, low consumption and good reliability of the engine, with the resulting need to provide an efficient cooling of the engine, and on the other hand there is also the need of finding the room for the various intake and exhaust conduits as well as the seats for the injectors and the pre-heating glow-plugs and the channels for the cooling fluid as well as the valve driving device, while keeping the size of the engine as reduced as possible.

SUMMARY OF THE INVENTION

In order to solve satisfactorily all the above indicated needs, the present invention provides an engine of the above indicated type, characterized by the combination of the following features:

a) said engine includes a cylinder head having for each cylinder two intake apertures and two exhaust apertures, respectively for receiving two intake valves and two exhaust valves, said apertures being formed by the ends of respective intake and exhaust conduits which are formed in the head and open at their opposite ends on two side longitudinal walls of the head parallel to the longitudinal direction of the head along which the cylinders are arranged, b) the two intake apertures and the two exhaust apertures associated with each cylinder have their axes respectively arranged in two planes which are substantially transverse with respect to the longitudinal direction of the head, with the end portion of the conduit opening at each aperture which is directed, at least for one intake aperture and one exhaust aperture, along a direction tangential with respect to the cylinder, c) the two intake apertures and two exhaust apertures associated with each cylinder are arranged, in a plan view, at the corners of a trapezium having its bases parallel to said longitudinal side walls of the cylinders head, d) the cylinders head has a seat for the injector at each cylinder, located at the centre of the cylinder, e) the two intake valves are directed along axes which converge substantially downwardly, each inclined with respect to a vertical direction by an angle not greater than 4°, preferably between 2° and 3°, f) the two exhaust valves are directed along axes substantially converging downwardly, each inclined with respect to a vertical direction by an angle not greater than 4°, preferably between 2° and 3°, g) the intake and exhaust valves are driven by two cam-shafts, mounted within the head, by means of rocker arms, h) one of the two intake conduits has a throttling section at its end portion, arranged so as to direct the flow along a direction substantially tangential with respect to the cylinder, i) the head has a seat for the pre-heating glow-plug at each cylinder, which is arranged along an inclined axis, between the intake aperture and the exhaust aperture which face towards one side of the head.

In a first embodiment, a first intake aperture is arranged at the end of a conduit portion directed tangentially with respect to the cylinder, whereas a second intake aperture is arranged at the end of a scroll-shaped conduit, the second aperture being located downstream of the first aperture with respect to the direction of the flow entering into the cylinder.

In one variant, both the intake apertures are arranged at the end of a conduit portion directed tangentially with respect to the cylinder.

BRIEF DESCRIPTION OF THE DRAWINGS

The invention will be now described with reference to the annexed drawings, given purely by way of non limiting example, in which:

FIG. 6 is a view in cross-section of another detail of FIG. 1, FIGS. 7, 8, 9 are cross-sections taken along lines VII—VII, VIII—VIII and IX—IX of FIG. 6, e

DETAILED DESCRIPTION OF THE INVENTION

Figure 1:
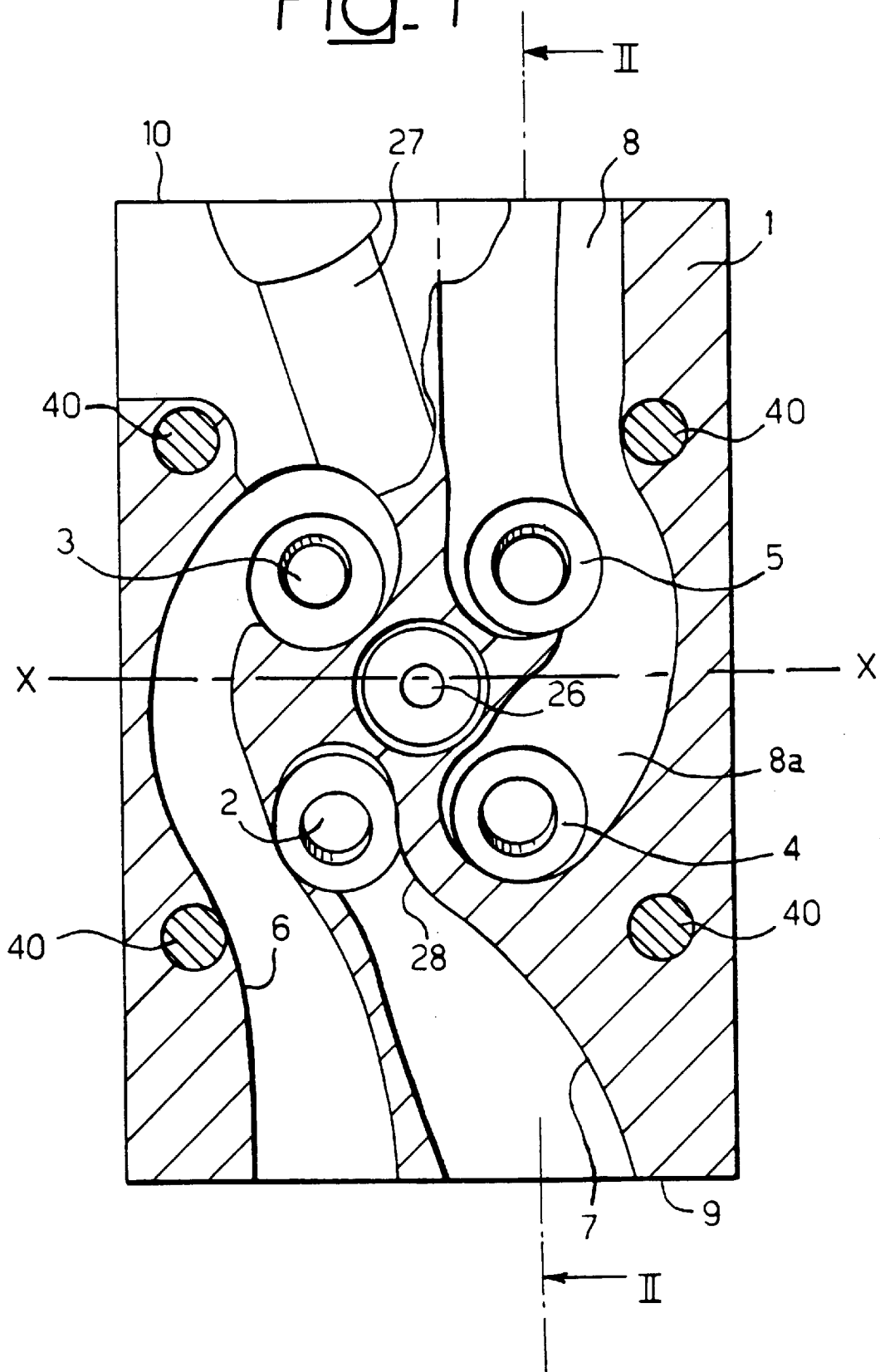
FIG. 1 is a partial plan view of the cylinder head forming part of the engine according to a first embodiment of the invention.

In the case of the example illustrated in the drawings, the engine according to the invention is provided with four cylinders in line. FIG. 1 shows a portion of the cylinder head at one cylinder, the remaining cylinders being aligned along a longitudinal direction X—X of the cylinder head. The body of the cylinder head, designated by reference number 1, is made of light alloy. At each cylinder, the body 1 of the head has two intake apertures 2, 3 and two exhaust apertures 4, 5. The intake apertures 2, 3 and the exhaust apertures 4, 5 are formed by the ends opening into the cylinder of two intake conduits 6, 7 and a single exhaust conduit 8 which branches in two portions ending at the exhaust apertures 4, 5. The ends of the conduits 6, 7, 8 opposite to the intake and exhaust apertures 2, 3 and 4, 5 open on the two longitudinal side wall 9, 10 of the cylinder head, which are parallel to the longitudinal axis X—X of the head 1.

As clearly shown in FIG. 1, the two intake apertures 2, 3 have their axes lying substantially in a plane transverse with respect to the longitudinal direction X—X. As a result of this, the intake conduit 6 has an end portion which merges into the intake aperture 3 and must be directed around the intake aperture 2, so that it extends tangentially with respect to the cylinder. This ensures very good fluid dynamic condition within the combustion chamber during engine operation.

Similarly, the two exhaust apertures 4, 5 have their axes arranged substantially in a plane transverse with respect to the longitudinal direction X—X of the cylinder head 1.

Figure 2:
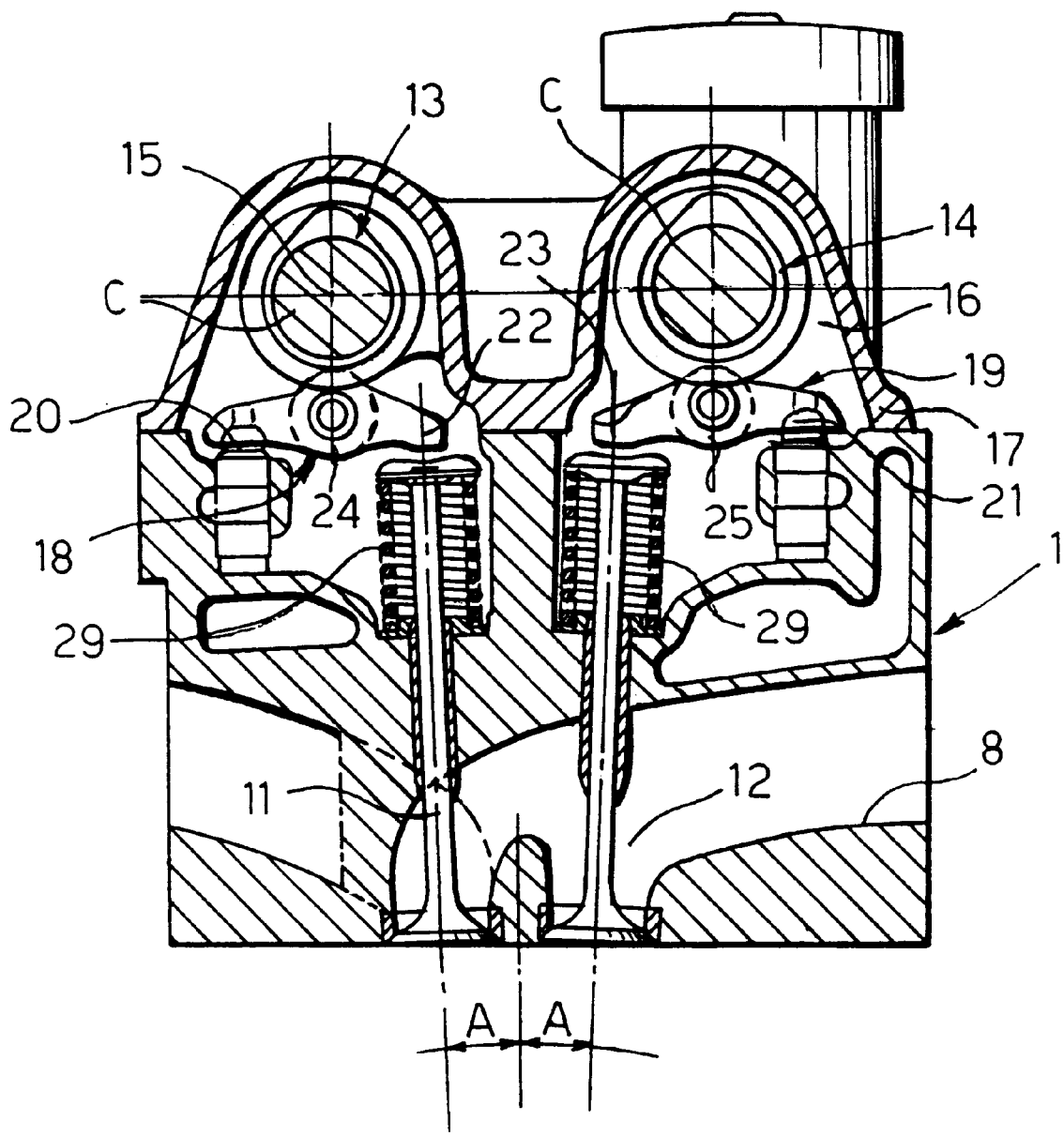
FIG. 2 is a view in cross-section taken along line II—II of FIG. 1.

With reference to FIG. 2, to the exhaust apertures 4, 5 there are associated exhaust valves 11, 12, whereas to the intake apertures 2, 3 there are associated respective intake valves (not shown in the drawings). The exhaust valves 11, 12 and the intake valves of all the cylinders of the head are driven by two cam-shafts 13, 14, which are rotatably supported around two axes 15, 16 by a lid 17 fixed to the upper surface of the head 1. According to an arrangement known per se, the valves are driven by the cams of the cam-shafts 13, 14 with the interposition of rocker levers 18, 19. Each of these lever is articulated at 20, 21 to a hydraulic tappet and have its opposite end 22, 23 which actuates the respective valve.

At its central area, the rocker lever supports a freely rotatable roller 24, 25 which cooperates without sliding with a respective cam of the cam-shaft.

As clearly shown in FIG. 2, the axes of the intake and exhaust valves converge downwardly, with a very reduced inclination with respect to a vertical direction, preferably not greater than 3°. Due to this feature, it is possible to provide the space between the four valves which is necessary for a seat 26 for the injector device associated with each cylinder. The seat 26 is shaped so as to support the injector device in a vertical position at the centre, between the four valves of each cylinder. The space left at this area, due to the inclination of the valves, is sufficient to arrange the injector device with the associated hydraulic lines (a feeding line and a return line) and the associated electric wire, while leaving a cooling channel within the wall of the seat.

According to a further feature, the two intake valves and the two exhaust valves are arranged, in plan view (FIG. 1), at the corners of a trapezium whose bases are parallel to the longitudinal side walls 9, 10 of the cylinder head 1. In particular, the intake valve 3 and the exhaust valve 5 are spaced at a greater distance from each other compared to the distance between the other two valves. Thus, between the valves 3, 5 there is left the space sufficient for a seat 27 for the pre-heating glow-plug which is associated with each cylinder.

A further important feature of the invention lies in that the intake conduit 7 is arranged along a direction having a very reduced inclination with respect to the horizontal. Due to this feature, the flow entering into the cylinder through the intake aperture 2 has a component mainly parallel to the plane perpendicular to the cylinder axis and a very reduced component along the direction of the cylinder axis, which ensures that very good fluid-dynamic conditions are obtained within the combustion chamber, for a good operation of the engine.

According to a further feature, the intake conduits 7 has a throttling section 28 close to the intake aperture 2. This throttling section renders the flow entering through the intake aperture 2 more tangential and increases the speed thereof.

In the illustrated example, the portion of the intake conduits 6 ending at the intake aperture 2 has a scroll-shaped portion which gives rise to a swirling flow at the outlet. As clearly apparent from FIG. 1, the scroll-shaped portion associated with the intake aperture 3 is arranged downstream of the first intake aperture 2, with reference to the tangential direction of the flow into the cylinder. This arrangement is chosen since the scroll-shaped portion thus has its thinner wall portion facing towards the injector seat 26, which leaves more space available for this seat and allows the design of the scroll to be optimized with no limits. Notwithstanding that the scroll associated with the intake aperture 3 is arranged downstream of the first intake aperture 2, the flow which enters into the cylinder through the aperture 2 does not affect the flow coming out of the scroll due to the position and shape of said throttling section 28, which renders the flow more tangential and increases the speed thereof, pushing strongly the flow against the wall of the cylinder so that this flow meets the helical flow coming out of the scroll of conduit 6 at a direction substantially coincident with that of the flow coming out of said scroll, which avoids the detrimental interference which usually takes place when the scroll is arranged downstream, with reference to the direction of flow. On the other hand, this arrangement of the scroll is advantageous since in this manner the end portion of conduit 6 is perfectly tangential and has the greatest possible distance with respect to the cylinder axis. It is to be considered that arranging the scroll associated with the intake aperture 3 upstream of the other intake aperture would not provide, as already discussed, a space sufficient for the injector seat, since said scroll would have its thicker wall facing towards said injector. Furthermore, this "upstream" arrangement of the scroll would not enable the conduit 6 to be formed between the boss 40 for a fixing screw and the end portion of conduit 7 which, being in form of a scroll, would have a particularly great bulk both in the vertical and radial direction, so that abutment surface of the valve return springs (designated by reference numeral 29 in FIG. 1) should be located at a higher level, which would involve moving upwardly the position of the axes of cam-shaft 13, 14.

A further advantage of the throttling section 28 lies in that it leaves between the intake aperture 2 and the exhaust aperture 4 a space sufficient for forming a channel for the cooling fluid at this area. Thus, it is not necessary to form a cooling channel below the conduits 7 which therefore can be formed along a very slightly inclined direction with respect to the horizontal, so as to achieve the above mentioned advantage of a flow entering into the cylinder having a very reduced component along the direction of the cylinder axis.

As discussed above, the valves may be inclined by a small angle with respect to a vertical direction (preferably by 2–3°) without jeopardizing the small size, the shape and the effective fraction of the combustion chamber. In this manner, furthermore, space is left which is necessary to house the valve springs as well as the injector with the associated seat without the need of reducing the size of the valves, which would be necessary if the valve axes were located more outwardly, for a given overall size of the cylinder head.

As also already discussed, the location at the corners of a trapezium of the valves enables the pre-heating glow-plug to be easily housed, while ensuring a very good cooling of the portions of the body of the head interposed between the glow-plug housing and the adjacent valves. The trapezium-like arrangement further contributes to ensure that between boss 40 of the fixing screw and the end portion of conduit 7 there is sufficient space for passage of conduits 6, without sacrificing the fluid-dynamical characteristics thereof. Again, the space necessary for all the elements is thus left without modifying the overall size of the engine and keeping the valve drive simple, light, with low friction and well tested. In a known solution, this problem was solved by arranging the valves at the corners of a square, which however is rotated by 10°–20° in an anti-clockwise direction (with reference to FIG. 1). This solution, however, is less advantageous, since it requires a more complex, heavy and expensive valve drive, because it is difficult to arrange the valves with an inclination and machining of the valve seats and guides must be done on different planes.

The possibility of inserting the glow-plug in the above indicated way further enables the inclination of the valves to be reduced within the limits which have been indicated above.

Summing up, all the measures which have been indicated above ensure that conduits having very good performances are obtained, while keeping the valves on two planes parallel to the engine axis and inclined by a small angle, and using a simple and reliable valve drive with low power absorption. The whole without increasing the height of the engine and without providing hydraulic or electric couplings in the oil environment. The system according to the invention can be adapted also with an injector device of a conventional type, but is mainly conceived for housing an electro-injector of a so called "common-rail" system. In this case it is indeed particularly important to have a space between the two cam-shafts sufficient to house the upper control unit of the electro-injector, which has a greater diameter and is provided with the above mentioned three connections.

The above described solution provides the best compromise between the various design needs and therefore is strongly preferable to all the solutions of the prior art.

The engine according to the invention is further characterized in that the jacket formed within the cylinder head for circulation of the cooling fluid has a shape resulting from that, within the mould which is used for casting the head, there is provided a core which is split horizontally in two superimposed parts, with a separation diaphragm between said parts, so that said head has an upper jacket and a lower jacket connected to each other at an area adjacent to the injector seat, and preferably having an annular shape surrounding said seat, which is obtained by interrupting the separation diaphragm, to provide a very good cooling particularly in the bridge-like portions between the valve seats and between the seat of the exhaust valve 5 and the associated conduit 8 and the seat of the glow-plug, exploiting the flow of the cooling fluid within the lower jacket, which is directed parallel to the plane of the head lower surface, in a substantially centripetal direction towards the communication passage to the upper jacket; the vertical flow (parallel to the cylinder axis) which is generated through said passage provides for the optimum cooling of the injector seat.

Figure 10:
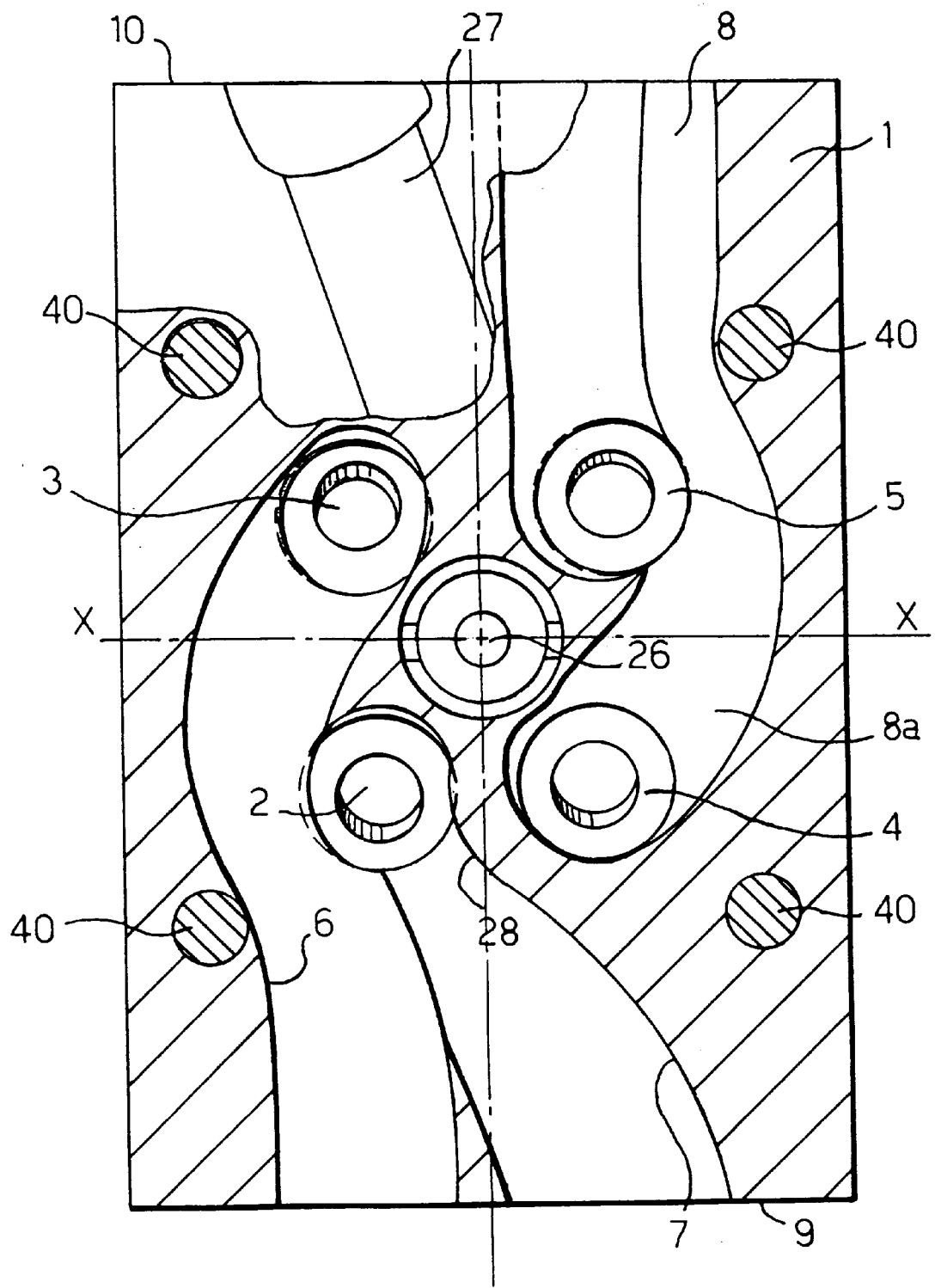
FIG. 10 shows a variant of FIG. 1, corresponding to a second embodiment of the invention.

Notwithstanding the embodiment that has been shown has a tangential intake conduit and a scroll-like conduit, it is also possible to provide both intake conduits as being tangential (FIG. 10). This latter solution enables further miniaturization of the engine to be obtained (up to 250 cc. for each cylinder, or even less). This is done because the need of reducing the cylinder diameter while keeping substantially the same size for the electro-injector (or the conventional injector) involves reducing to a greater extent the radial space available for housing the valves. As a result of this, the valve diameter, and even more the minimum diameter of the valve seat, is greatly reduced. It must be considered that a high moment must be imparted to the air entering into the engine and this moment must increase when the cylinder diameter is reduced. The acceleration of the air swirl when passing through the restricted section of the valve seat causes, in the case of a scroll-shaped conduit, a pressure loss and hence a loss of filling of the engine, which, in the case of very reduced cylinder diameter, becomes excessive. This drawback may be overcome by resorting to diameter/stroke ratios much greater than 1 so as to avoid a great reduction of the valve diameter. However, in the case of a direct injection Diesel engine, this would lead to excessive losses from the stand-point of the effective use of the volume of the combustion chamber and heat losses depending upon the surface/volume ratio. These two parameters are yet at critical levels with reduced displacement engines. The use of conduits which are both tangential, however, overcomes this drawback, eliminating the loss of pressure/engine filling due to the flow of the swirl generated by the scroll through the restricted section of the valve seat. Indeed, in this case no swirl is generated upstream of the valve seat and the speeds reached at the throttling sections of the conduits (such as section 28 of FIG. 3) are those which are necessary to generate the tangential speeds within the cylinders which are requested for mixing and combustion of the Diesel oil. Since said throttling section in the conduits have a lower cross-section than that of the valve seat, and since there is no swirl upstream of the valve seat, no pressure differential is generated beyond that which is necessary to create the tangential speed which is requested within the cylinder to ensure the combustion.

It is also important to consider that, in order to make the engine size as small as possible, the arrangement according to the invention of the pre-heating glow-plug is very useful.

Figure 3:
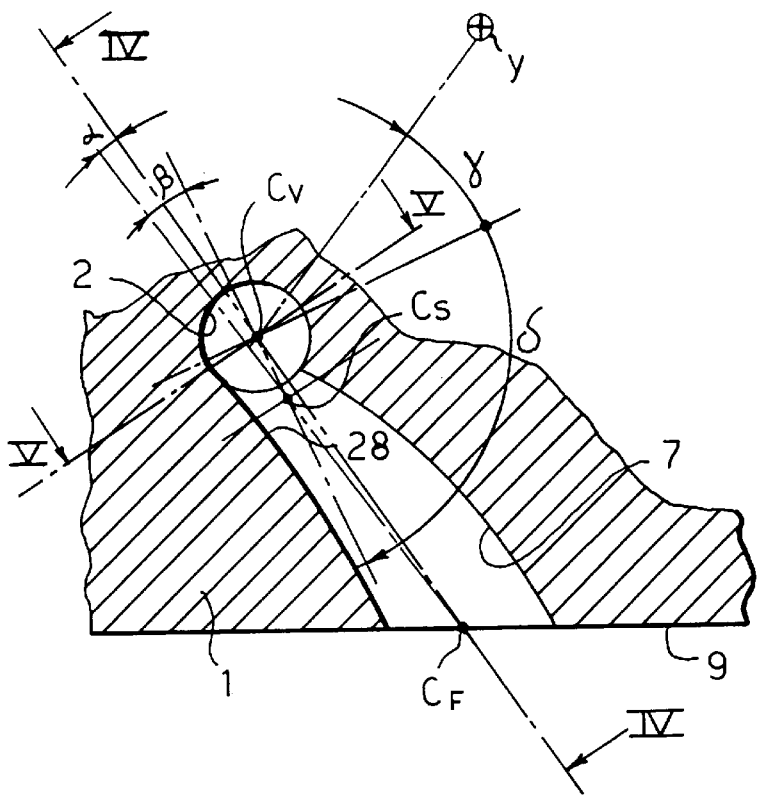
FIG. 3 is a further view in cross-section of a detail of FIG. 1, FIGS. 4, 5 are views in cross-section taken along lines IV—IV and V—V of FIG. 3.

In FIG. 3, there is shown the intake conduit 7 and $C_s$, $C_v$ and $C_f$ respectively designate the centre of the throttling section 28, the centre of the valve and the centre of the conduit, where the latter opens on the side 9 of the head. In a preferred embodiment, the angle α formed between the straight line joining $C_f$ to $C_s$ and the straight line joining $C_f$ to $C_v$ is between 0° and 5°. Furthermore, the joining line $C_v$, $C_s$ forms with $C_f$, $C_s$ an angle β between 10° and 15°.

Figure 4:
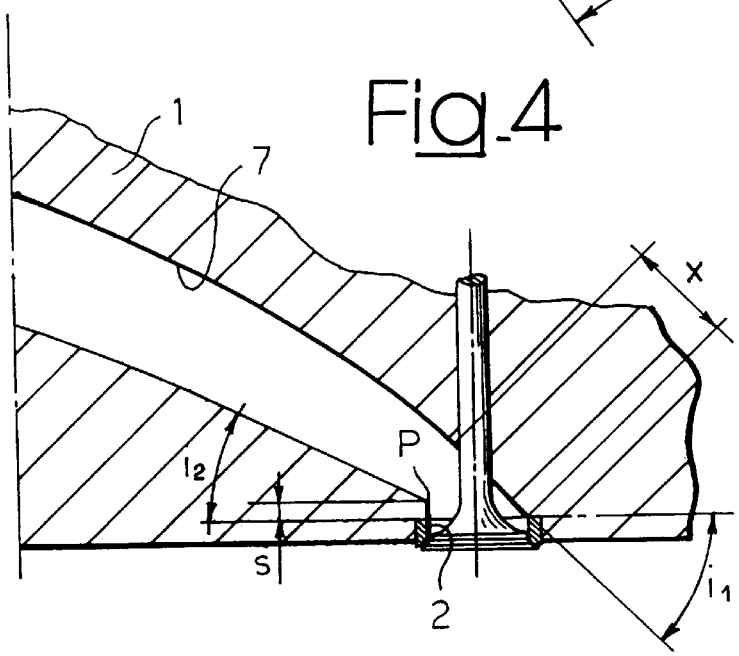
Figure 5:
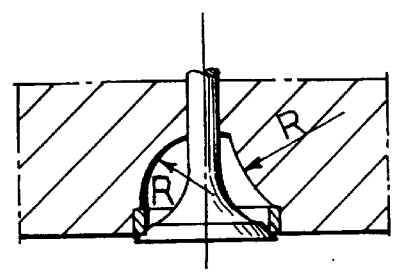

With reference to FIG. 4, the cross-section of conduit 7 has an upper profile with a substantially straight portion X adjacent to the valve seat, inclined relative to the base plane of head 1 by an angle $i_1$ between 40° and 45°, said portion X extending substantially up to the inner edge of the valve seat. The lower profile is inclined by an angle $i_2$ between 15° and 25° and extends up to a point P spaced by a length S of 2–4 mm from the inner edge of the valve seat. In the cross-section of FIG. 5, the profile of the conduit on the side facing towards the periphery of the cylinder (i.e. on the left in FIG. 5) is concave, according to the conventional art, whereas on the opposite side, contrary to what is known, it is convex. Finally, the conduit axis is inclined relative to the line joining the centre $C_v$ to the cylinder axis Y by an angle δ of 90° plus an angle γ between 0° and 30°.

FIGS. 7–9 show the intake conduit 6, in the flow directing version (without scroll). The end portion of the conduit has an inclination φ of 25°–35° relative to the base plane of the head 1. The cross-section (FIG. 8) of the conduit is rectangular, with sides $L_1$, $L_2$ having the ratio $L_1/L_2=1.1–1.4$ substantially up to the area immediately above the valve. In the cross-section of FIG. 7, the conduit 6 has an upper profile which extends up to the inner edge of the valve seat, whereas the lower profile starts from a point P spaced from the inner edge of the valve seat by a distance s of 2–4 mm. The straight line $C_vY$ is orthogonal to the axis of the conduit 6 in the end portion thereof (δ=90°). The straight portion of the conduit has a length 1 which is 2–3 times the diameter $D_v$ of the valve. Also in this case, in the cross section of FIG. 9 the conduit is convex on the (right) side facing towards the centre of the cylinder.

Another advantage of the engine according to the invention lies in that the intake and exhaust valves may be identical, which simplifies the machining operations of the valve seats and the valve guides.

Naturally, while the principle of the invention remains the same, the details of construction and the embodiments may widely vary with respect to what has been described and illustrated purely by way of example, without departing from the scope of the present invention.

What is claimed is:

1. Internal combustion Diesel engine, for motor-vehicles, having a number of cylinders in line, with direct injection, characterized by the combination of the following features:

a) said engine includes a cylinder head (1) having for each cylinder two intake apertures (2, 3) and two exhaust apertures (4, 5) respectively for receiving two intake valves and two exhaust valves (11, 12) said apertures (2–5) being formed by the ends of respective intake (6, 7) and exhaust (8) conduits which are formed in the head (1) and open at their opposite ends on two longitudinal side walls (9, 10) of the head (1) parallel to the longitudinal direction (X—X) of the head (1), along which the cylinders are arranged, b) the two intake apertures (2, 3) and the two exhaust apertures (4, 5) associated with each cylinder have their axes respectively arranged substantially in two planes transverse relative to the longitudinal direction (X—X) of the head (1) with the end portion of the conduit opening at each aperture which is directed, at least in the case of one intake aperture (2) and one exhaust aperture (4), along a tangential direction with respect to the cylinder, c) the two intake apertures (2, 3) and the two exhaust apertures (4, 5) associated with each cylinder are arranged, when seen in plan view, at the corners of a trapezium having its bases parallel to said longitudinal side walls (9, 10) of the cylinder head with a first intake aperture and a first exhaust aperture on one of said bases being spaced apart a distance greater than a distance between a second intake aperture and a second exhaust aperture on another of said bases, d) the cylinder head (1) has a seat (26) for the injector at each cylinder, arranged at the center of the cylinder, e) the two intake valves are directed along axes substantially converging downwardly, each inclined relative to a vertical direction by an angle not greater than 4°, f) the two exhaust valves (11, 12) are directed along axes substantially converging downwardly, each inclined relative to a vertical direction by an angle not greater than 4°, g) the intake and exhaust valves are driven by two cam-shafts (13, 14) arranged in the cylinder head, through rocker arms (18, 19), h) one of the two intake conduits (7) has a throttling section (28) in its end portion which is arranged so as to direct the air flow along a direction which is strongly tangential relative to the cylinder, i) the head (1) has at each cylinder a seat (27) for pre-heating glow-plug, arranged along an inclined axis, at the major base of said trapezium, between an intake aperture (3) and an exhaust aperture (5).

2. Engine according to claim 1, characterized in that a first intake aperture (2) is arranged at the end of a conduit portion directed tangentially relative to the cylinder, whereas a second intake aperture (3) is arranged at the end of a scroll-shaped conduit, the second aperture (3) being located downstream of the first aperture (2) with reference to the tangential direction of flow within the cylinder.

3. Engine according to claim 1, characterized in that both the intake apertures (2, 3) are arranged at the end of a conduit portion directed tangentially relative to the cylinder.

* * * * *